March 12, 1957 P. D. STAHL 2,785,308
FREQUENCY STANDARD
Filed March 8, 1954 2 Sheets-Sheet 1
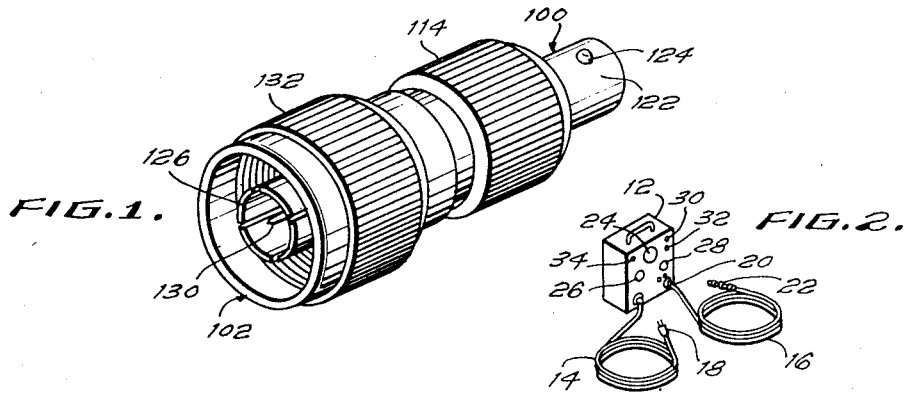
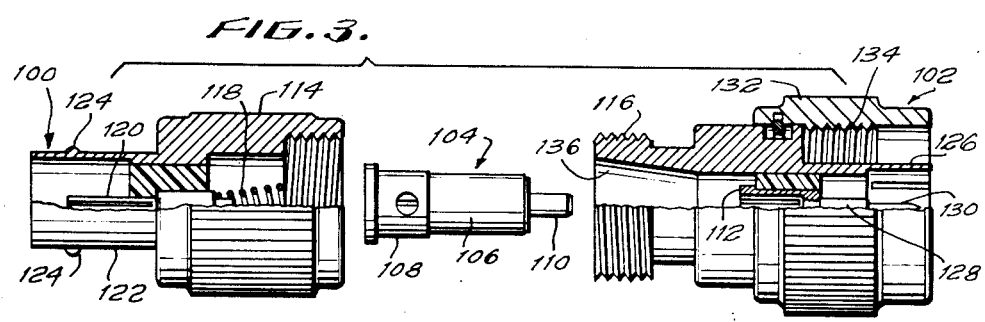
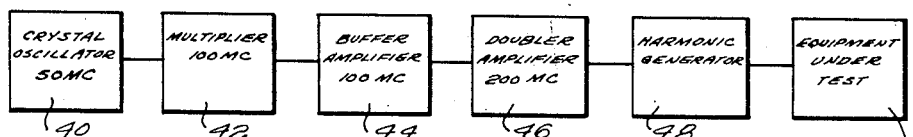
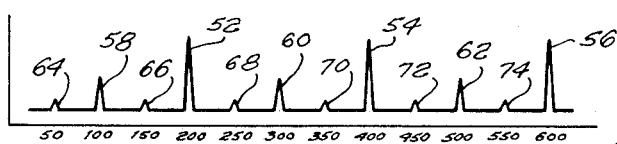
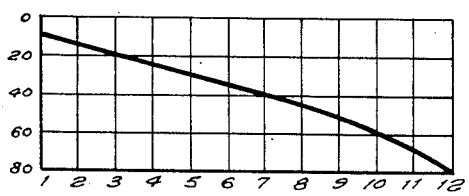
INVENTOR
PHILIP D. STAHL
BY
*James and Franklin*
ATTORNEYS March 12, 1957

P. D. STAHL 2,785,308

FREQUENCY STANDARD

Filed March 8, 1954

INVENTOR
PHILIP D. STAHL
BY
James and Franklin
ATTORNEYS

United States Patent Office 2,785,308
Patented Mar. 12, 1957

2,785,308

FREQUENCY STANDARD

Philip D. Stahl, Paramus, N. J., assignor to Presto Recording Corporation, Paramus, N. J., a corporation of New York Application March 8, 1954, Serial No. 414,713

11 Claims. (Cl. 250—36)

This invention relates to frequency standards, and more particularly to a secondary frequency standard for the VHF and UHF spectrum.

A typical problem requiring a secondary frequency standard is that of a manufacturer of radio receivers in a range of, say, 100 to 10,000 mc. The manufacturing specification may require such a receiver to be calibrated to an accuracy of, say, plus or minus 30 mc. at 10,000 mc. The receiver might be calibrated by using an accurate heterodyne frequency meter used to first calibrate a conventional signal generator at one desired frequency, then using the signal generator immediately to adjust the receiver at that frequency, then calibrate the signal generator at the next frequency, and so on. This required many hours of work to calibrate a single receiver. Moreover, the test equipment is quite costly.

One object of the present invention is to provide a frequency standard which is small, light, relatively inexpensive, and which will facilitate relatively rapid calibration of receivers, signal generators, and the like. For this purpose the frequency standard transmits marker frequencies at desired intervals all at the same time, and these are preferably made more readily identifiable by a relative difference in strength at repetitive intervals. For example, the marker interval may be 50 mc. with a substantially stronger marker at 100 mc. intervals, and a still stronger marker at 200 mc. intervals. The receiver, even before adjustment, is accurate enough to select or identify one of the strong markers, and thereafter the receiver may be calibrated throughout the frequency spectrum.

A further object is to provide such a secondary frequency standard of extreme accuracy. In the case mentioned above, requiring an accuracy of plus or minus 30 mc., the marker signals should be within a limit of plus or minus 3 mc., and preferably 2 mc., because in good engineering practice the measuring equipment should be at least ten times as accurate as the calibration being sought, lest error arise by reason of the calibration equipment itself.

Another object is to make it possible to suppress or eliminate one or another series of markers when desired. For example, either the 50 mc. interval marker or the 100 mc. interval marker or both, may be eliminated or restored whenever desired.

To accomplish the foregoing general objects, and other more specific objects which will hereinafter appear, my invention resides in the frequency standard elements, and their relation one to another, as are hereinafter more particularly described in the following specification. The specification is accompanied by drawings, in which:

Fig. 1 is a perspective view of a holder for a crystal rectifier employed in the present invention;

Fig. 2 is a perspective view of the complete apparatus, drawn to very small scale;

Fig. 3 is a partially sectioned view of the holder, with the parts separated and drawn to enlarged scale;

Fig. 4 is a box diagram of the apparatus;

Fig. 5 is a graph explanatory of the marker signals supplied by the present apparatus;

Fig. 6 is a graph explanatory of one characteristic of the invention;

Figure 7:
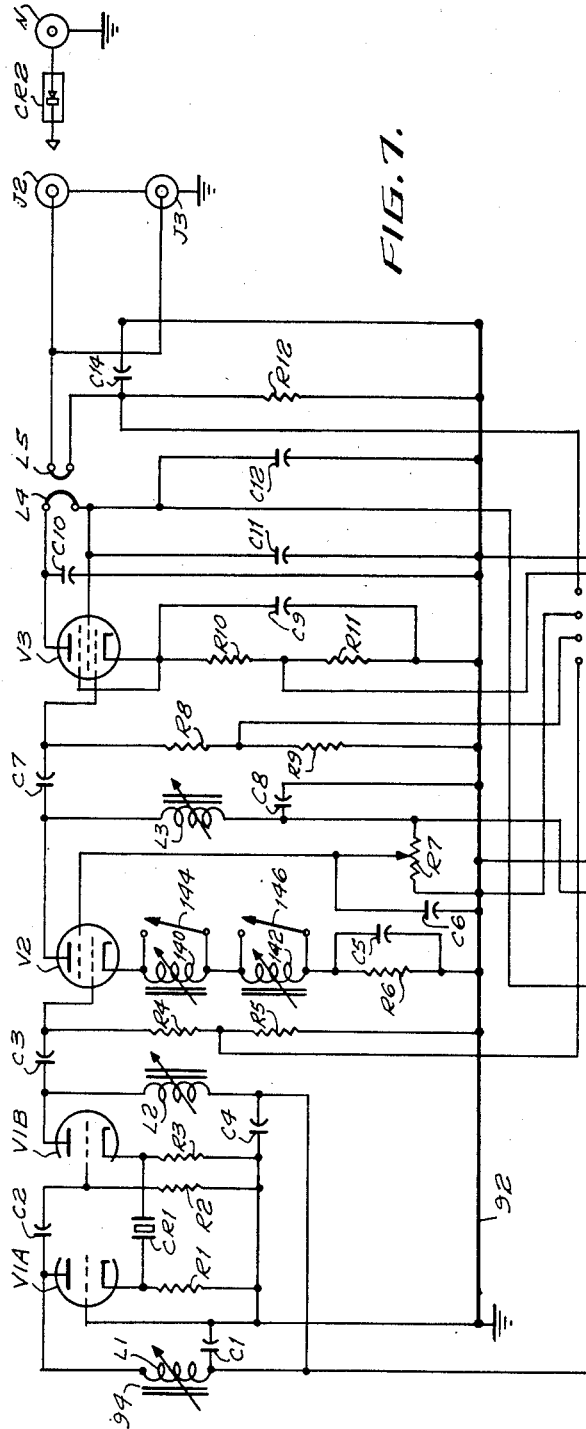
Fig. 7 is a schematic wiring diagram for a specific apparatus embodying features of the present invention.

Referring to the drawing, and more particularly to Fig. 2, the microwave secondary frequency standard comprises a relatively small portable case 12 detachably receiving two flexible cables 14 and 16. The cable 14 may be an ordinary A. C. power line supply cord, with a conventional male plug 18 for use with an ordinary wall outlet. The cable 16 is a coaxial cable which terminates at the end 20 in a "BNC" male connector. The case 12 has a female BNC socket receiving the connector 20. The opposite end of cable 16 terminates in a crystal holder 22. This has a BNC connection to the cable 16, and itself terminates in an "N" connection available for attachment to the microwave apparatus (not shown) being tested or adjusted.

The front face of case 12 has a meter 24. This may be an ordinary D. C. milliammeter. There is a selector switch 26 which changes the connections to the meter so that it may be used to check the operation of the frequency standard itself. The output may be controlled by means of a knob 28. The apparatus may include a power switch at 30, and a standby switch at 32. The latter keeps the filaments of the tubes energized while removing the high voltage from the anodes. A pilot light may be provided at 34.

Referring now to the box diagram of Fig. 4, the apparatus comprises a crystal controlled oscillator 40 using, in this case, a quartz crystal which is resonant at 50 mc. The crystal controlled oscillator is followed by a frequency multiplier 42, providing an output at 100 mc., which may be amplified in a buffer amplifier 44. The output frequency is then doubled in a doubler amplifier 46, which provides an output at 200 mc. This in turn is supplied to a harmonic generator 48, in this case a crystal diode, which generates harmonics of much higher frequency, which in turn are supplied to the equipment under test, indicated by box 50.

Referring now to Fig. 5 of the drawing it will be seen that strong marker signals 52, 54 and 56 are produced at intervals of 200 mc.; substantially weaker marker signals 58, 60 and 62 are produced at intervals of 100 mc. between the 200 mc. markers; and still weaker signals 64, 66, 68, 70, 72 and 74 are produced at intervals of 50 mc. between the aforesaid intervals of 100 and 200 mc. These markers are produced over a much wider spectrum than is indicated in Fig. 5, and indeed a typical spectrum would be from 50 to 11,000 mc. or more. A common example of the equipment under test (box 50 in Fig. 4) is a radar receiver working at ultra high frequency. The radar receiver has an indicator "scope," and as the tuning dial is turned a pip will appear, and then disappear, and later another appear, and so on. These pips should appear at proper points on the tuning dial scale, and thus calibration may be established, or adjustments changed. All that the present apparatus does is to feed a signal to the radar receiver, but that signal is a very special kind of signal having the characteristics represented in Fig. 5, and going up to a much higher range of frequency than there shown.

Referring now to Fig. 7 of the drawing, the apparatus comprises three tubes V1, V2 and V3, and a rectifier V4, but the tube V1 is a double triode, the two parts of which are marked V1A and V1B. The tube V1 and the circuits centering around it are an oscillator doubler which provides the 50 and 100 mc. output. The tube V2 and the circuit centering thereon is an amplifier operating at 100 mc. The tube V3 is a frequency doubler and power amplifier the output tank circuit of which is resonant at 200 mc. The crystal diode or rectifier is shown at CR2, while the frequency controlling piezo crystal is shown at CR1.

Power is supplied through plug 18 and cord 14 under control of a switch 30. A protective fuse is indicated at 31. The power supply includes a transformer 80 with a primary 82, and multiple secondaries 84, 86 and 88. Secondary 84 is a low voltage secondary used to heat the cathode of rectifier tube V4. Secondary 88 is a low voltage secondary used to heat the filaments of the tubes V1, V2 and V3, these being shown at 90. The pilot light may be connected at 34.

Transformer secondary 86 is a high voltage secondary the terminals of which are connected to the anodes of rectifier tube V4, and the center tap of which is connected to ground, as indicated by the heavy line 92 and its ground connection. The standby switch 32 is located in the ground connection so that on opening the switch the apparatus is de-energized except for the heater filaments of the tubes.

The milliammeter is shown at 24, while the switch for changing the manner in which the meter is connected to the circuit is shown at 26.

The crystal CR1 may be a standard quartz crystal, in a standard holder, appropriately compensated to maintain a desired degree of accuracy, depending on the accuracy required for the test apparatus.

In the particular apparatus here shown the tube V1 is a dual triode type 12AT7. It functions as an oscillator doubler controlled by the 50 mc. crystal CR1, and it has a 50 mc. tank circuit L1 on one side, and a 100 mc. tank circuit L2 on the other. The tank circuits are adjustable slug tank circuits. Specifically, the coil L1 constitutes a resonant circuit for the tube V1A, the capacitance of the said circuit not being shown, it being distributed capacitance. The core 94 is a copper core or so-called "slug," and its insertion in the coil is adjustable to afford tuning of the circuit.

The condenser C1 is a bypass condenser, in this case 1,000 mmf. The condenser C2 is a coupling condenser, in this case 100 mmf. The resistor R1 is a self-bias cathode resistor in this case 470 ohms. The resistor R2 is a grid-leak resistor for the tube V1B, and in this case is 4700 ohms. The resistor R3 is a self-bias cathode resistor for the tube V1B, in this case 470 ohms. The capacitor C3 is a coupling condenser, in this case 100 mmf. The capacitor C4 is a bypass condenser, in this case 1,000 mmf.

The tube V2 is a type 5654. The resistor R4 is a grid-leak for the tube V2, in this case 27,000 ohms. The resistor R5 is a shunt resistor for the meter 24 when the switch is in the #1 position as shown. In the present case the resistor R5 is 1,000 ohms. The resistor R6 is a self-bias cathode resistor for the tube V2, and in this case has a value of 100 ohms. The capacitor C5 is a cathode bypass condenser for the tube V2, and the capacitor C6 is a screen bypass condenser for the tube V2, each having a value of 1,000 mmf. The resistor R7 is a variable screen voltage divider for controlling the output amplitude (it being controlled by the knob 28 shown in Fig. 2). In the present case it has a value of 25,000 ohms and a rating of 4 watts.

The inductance L3 is a 100 mc. tank circuit for the amplifier tube V2. It is adjustable by means of a copper slug. The tube V3 is a type 5763. With its associated circuits it functions as an amplifier doubler. It is operated as a Class "C" amplifier, and acts both as a frequency doubler and as a power amplifier.

The capacitor C7 is a coupling condenser having a value of 50 mmf. The capacitor C8 is a bypass condenser having a value of 1,000 mmf. The resistor R8 is a grid-leak resistance for the tube V3 and has a value of 33,000 ohms. The resistor R9 is a shunt across the meter 24 in the #2 position of switch 26, and in the present case has a value of 47 ohms. The resistor R10 is a self-bias cathode resistor for the tube V3 and has a value of 270 ohms with a rating of one watt. The resistor R11 is a shunt resistor across the meter 24 in the #3 position of switch 26. This resistor has a value of 1 ohm. The capacitor C9 is a cathode bypass condenser for the tube V3 and has a value of 1,000 mmf.

The capacitor C10 is a variable tuning capacitor for the tank circuit L4 of tube V3 and has a value of from 3 to 13 mmf. The capacitor C11 is a screen bypass condenser for the tube V3 and has a value of 1,000 mmf. The capacitor C12 is a bypass condenser for the tank circuit L4 and has a value of 1,000 mmf. The inductance L4 is a hairpin loop which may be tuned to 200 mc. with the capacitor C10, and is inductively coupled to a hairpin loop L5. The resistor R12 is a shunt resistor across the meter 24 in the #4 position of the switch 26, and has a value of 1 ohm. The capacitor C14 is a bypass condenser for the inductance L5 and has a value of 1,000 mmf.

J2 represents the female socket for a BNC coaxial connector, and J3 represents another such socket arranged in parallel. This makes it possible to use two coaxial cables and crystal diodes to drive two receivers or test circuits at the same time.

The parts of the power supply will be understood without detailed description, but briefly, the secondary 86 is the high voltage secondary; the capacitor C13 is a filter condenser having a value of 18 mfd.; and R13 and R14 are series dropping resistors having values of 10,000 and 4,000 ohms, respectively with a rating of 5 watts. Resistor R13 drops the voltage for the tube V1, and the resistor R14 drops the voltage for the tube V2. This apparatus will operate from a power supply of 115 v. plus or minus 10% and at a frequency anywhere from 50 to 1750 C. P. S., the power consumption being approximately 60 watts when the A. C. supply is at 60 cycles.

The meter 24 is a milliampere meter having a range of zero to one milliampere. The capacitor C17 is a bypass condenser for the meter, and has a value of 1,000 mmf. The capacitors C15, C16 and C18 are filament bypass capacitors having a value of 1,000 mmf. each.

It will be understood that the foregoing quantitative values have been given solely by way of exemplification rather than in limitation of the invention.

The crystal rectifier CR2 is a silicon diode rectifier of a type already known and used for detection purposes, and also for frequency multiplication to a specific single frequency in the microwave region. It is mounted at the end of a flexible coaxial cable in order that the high frequency output may be fed directly into the equipment being tested with no transmission line therebetween.

The crystal holder is shown in Figs. 1 and 3 and will be described with reference thereto. Most crystal holders are of the plumbing type for use in a wave guide, not suitable here because of limited frequency range. In contrast a coaxial cable has a wide frequency range, and the present crystal mount is made to fit into the same. A mount has been made before, for purpose of rectification, with the input at the N end, and with the output at the BNC end. It will be understood that a BNC connector is suitable for the lower frequencies or VHF frequencies up to, say, 1,000 mc., while an N connector is good for higher frequencies over, say, 1,000 mc. and through the UHF range and up to microwaves. Such a detector mount was characterized by distributed shunt capacitance, which was not injurious, and indeed was helpful, in shunting the UHF energy beyond the crystal, while permitting the detected and desired relatively lower VHF energy to pass through to the coaxial cable at the BNC end.

Referring now to Fig. 1, the crystal holder there shown receives the marker signal energy at a BNC type connector 100 which receives the free end of the coaxial cable (16 in Fig. 2). The opposite end 102 is an N type connector which will connect to the receiver or other circuit being tested, and supply to it high frequency energy in the range of from 50 to 11,000 mc. Fig. 3 shows the crystal holder disassembled, with the crystal unit itself shown at 104. The body portion 106 is ceramic, while the end portions 108 and 110 are metallic. The crystal itself is housed within the ceramic portion 106. The part 110 is pushed into a resilient split sleeve 112, and then the internally threaded part 114 is screwed on to the thread 116. This causes a compression spring 118 to bear against the brass end 108, thereby establishing contact to the center small diameter resilient split tube 120. This is connected to the center conductor of the coaxial cable (16 in Fig. 2). The outer conductor is connected to the cylindrical part 122. This has a pair of diametrically opposite projections 124 which receive a mating female part secured to the end of the coaxial cable so that the connection is a detachable one.

At the opposite end the threaded part 116 is continued and eventually terminates in a resilient split sleeve 126. The small diameter split sleeve 112 which receives the prong of the crystal is mounted in appropriate insulation, and terminates in a pin 128 which is reduced to small diameter and preferably pointed at 130. The body portion receives a freely rotatable cap or nut 132 which is internally threaded at 134. It will be understood that this cooperates with an externally threaded part of a mating N type connector on the receiver or other apparatus to be tested.

Figure 8:
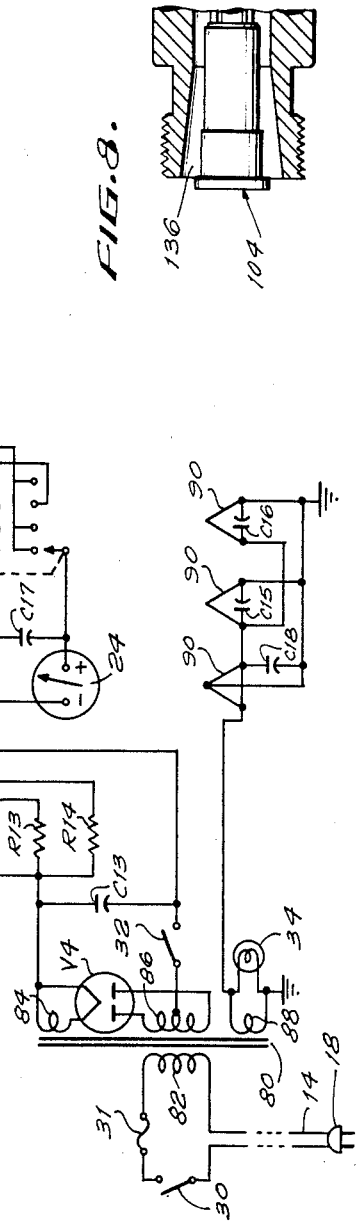
Fig. 8 is explanatory of a feature of the invention.

It is significant that there is considerable free space around the crystal as shown at 136 in Fig. 8, for this minimizes the shunting or bypass of high frequency energy, thus permitting it to efficiently pass from the crystal to the N type end 102 of the crystal holder. With the usual crystal holders as now made, there is metal in the space shown, and the consequent capacitance shunts the high frequency energy. Such a holder would not be usable for the present purpose.

The input at the receiver or other apparatus being tested is assumed to be at 50 ohms, and should have a D. C. ground return in order for the silicon diode to function normally. As an alternative a shorting stub can be shunted across the receiver input.

In practice the only limit on the useful frequency range of this device is the sensitivity of the succeeding equipment. What is meant is that the energy delivered falls off at high frequency. This is shown in Fig. 6, which plots the output power in minus dbm., as a function of K mc. or thousands of megacycles. In the present state of the art the output down to minus 60 dbm. is useful, and thus the range may be considered as going up to 10,000 mc. However, with more sensitive equipment already available the energy may be usefully employed down to 80 and even 90 dbm., thus further increasing the usable frequency range.

It will be understood that the wave fed to the crystal rectifier is a rather unusual and complex wave, it being a 200 mc. wave of largest amplitude, modulated by a 100 mc. wave of lesser amplitude, and modulated by a 50 mc. wave of least amplitude. An operator using the equipment easily knows within 200 mc. the frequency that he is at, and can tell the 200 mc. marker by its amplitude. Similarly he can readily recognize the 100 and 50 mc. markers by their differences in amplitude. However, if desired the equipment may be elaborated slightly to make it possible to suppress either or both of the 50 and 100 mc. markers at will. This is done by the use of trap circuits which may be made operative or inoperative at will. Referring to Fig. 7, there is a variable inductor 140 the copper slug of which is adjusted to be resonant at 50 mc., and another variable inductor 142 the copper slug of which is adjusted to be resonant at 100 mc. They are shunted by switches 144 and 146. With both switches closed the circuit functions as heretofore described. With switch 146 alone closed the 50 mc. marker is suppressed. With switch 144 alone closed the 100 mc. marker is suppressed. With both switches open the two markers are suppressed, leaving only the 200 mc. marker. It will be understood that these switches should be controlled by means of long shafts so that the switch can be used without appreciable length of lead going to the switch. An alternative is the use of high frequency relay switches so that the controls at the front panel merely control relay switches localized in the high frequency circuit.

It has already been mentioned that the switch 26 is a selector switch to change the connections to the meter 24. This makes it possible to check the operation of the apparatus from time to time, without requiring additional instruments for that purpose. In position #1 the meter measures the grid current of the tube V2, and thereby checks the operation and the output of the tube V1. In the second position of the switch the meter measures the grid current of the tube V3, and thereby checks the operation and the output of the tube V2. In the third position of the switch the meter measures the D. C. cathode current of the tube V3. This is a power tube and it draws the heaviest current. Thus the meter checks the normality of the operation of the tube V3, and incidentally of the preceding tubes as well. In the fourth position of the switch the meter measures the D. C. current through the silicon crystal rectifier CR2. This checks two things; first, the output from the tube V3, and, second, the operating condition of the crystal.

When connected to a suitable microwave receiver or other sensitive detector, the equipment delivers accurate marker signals every 50, 100, and 200 mc. Using an auxiliary wavemeter or signal generator any particular marker can be identified and from there on the markers can be counted to reach any other frequency. It is usually easy to distinguish between the three types of markers in any 200 mc. sector by comparing the relative amplitudes of the signals. Markers resulting from a 200 mc. base frequency will be at least 6 db stronger than the 100 mc. markers, and at least 12–15 db stronger than the 50 mc. markers. Experience will soon enable the operator to quickly determine which marker is under observation. The trap circuits 140 and 142 are not needed and are not used in the apparatus as now manufactured.

There are no tuning adjustments required to use the instrument. The output control 28 or R7 is adjusted to produce the required signal level. The output level will vary over the spectrum. In general, the microwave output power will be inversely proportional to the harmonic number (base frequency, 200 mc.). The meter switch 26 should be kept in the No. 4 position where the D. C. current through the silicon diode is monitored. For maximum diode life, the D. C. current should be held to the minimum value required for a specific application. Depending upon the particular diode in use, the maximum D. C. current will be approximately .85 (85 ma.) with the output control on full.

It is believed that the construction, operation and method of use of my improved microwave secondary frequency standard, as well as the advantages thereof, will be apparent from the foregoing detailed description. The apparatus is small and light. A typical frequency standard for comparable use as heretofore made employed a rack 4 ft. high, required fifty tubes, and was costly. It required a number of wave guide type crystal holders. The present apparatus is housed in a case only 7" x 6" x 6" and weighs only about 8 lbs. It sells for a price only one-twentieth that of the previous apparatus. It works over a broad frequency range, with only a single crystal mount, and provides all markers simultaneously.

It generates accurate test signals over an extremely wide range of from, say, 50 to 11,000 mc. without any frequency tuning whatsoever. It delivers to the 50 ohm input of a typical microwave receiver an uninterrupted series of C. W. signals spaced at 50, 100 and 200 mc. These may be identified by comparison of relative amplitude, for the 200 mc. output is greater than the 100 mc. output, and the latter is greater than the 50 mc. output. This device, in conjunction with a suitable microwave receiver and an auxiliary signal generator, will enable fool-proof and rapid measurement of frequencies from 50 to 11,000 mc. to an accuracy of plus or minus 0.005%. The device may be used to calibrate standard signal generators; to establish standard frequency; to calibrate and align receivers; to test radar or microwave installations by radiating signals in conjunction with standard microwave antennae; and to provide markers for panoramic displays.

It will be understood that the functions of frequency multiplication and of amplification may be either separated or combined, as desired. The change from 100 to 200 mc. may be produced by a frequency multiplier, followed by a power amplifier, instead of both in a single tube as here shown. Conversely, the change from 50 mc. to 100 mc., and the amplification thereof, may be obtained in a single stage, instead of in two separated tubes or stages, as here shown. These and other changes may be made, and it therefore will be understood that while I have shown and described my invention in a preferred form, changes may be made without departing from the scope of the invention, as sought to be defined in the following claims.

I claim:

1. A frequency standard for VHF-UHF (very high frequency-ultra high frequency), said standard providing marker signals at marker intervals, and comprising an oscillator for generating a desired marker frequency, a quartz crystal having a frequency corresponding to the desired marker frequency connected into said oscillator for controlling said oscillator, a frequency multiplier and amplifier connected to and fed by said oscillator for doubling the oscillator frequency, a flexible coaxial cable connected to the output of said amplifier, a crystal holder at the free end of said cable and carrying a crystal diode driven by said amplifier and having a non-linear characteristic to produce a rich supply of VHF (very high frequency) and UHF (ultra high frequency) harmonics, said crystal holder having a VHF (very high frequency) end connected to the coaxial cable and a UHF (ultra high frequency) end adapted to be connected directly to a UHF (ultra high frequency) receiver or other apparatus to be tested or calibrated, whereby stronger signals are produced over the desired wide frequency spectrum at intervals twice the marker frequency, and weaker signals are produced at the marker frequency between the double intervals, so that both are utilizable but are recognizably different.

2. A frequency standard for VHF-UHF (very high frequency-ultra high frequency), said standard providing marker signals at marker intervals, and comprising an oscillator for generating a desired marker frequency, a quartz crystal having a frequency corresponding to the desired marker frequency connected into said oscillator for controlling said oscillator, a frequency multiplier and amplifier connected to and fed by said oscillator for doubling the oscillator frequency, a power amplifier connected to and fed by said multiplier, the output of said amplifier being tuned to double the double marker frequency, a flexible coaxial cable connected to the output of said power amplifier, a crystal holder at the free end of said cable and carrying a crystal diode driven by said power amplifier and having a non-linear characteristic to produce a rich supply of VHF (very high frequency) and UHF (ultra high frequency) harmonics, said crystal holder having a VHF (very high frequency) end connected to the coaxial cable and a UHF (ultra high frequency) end adapted to be connected directly to a UHF (ultra high frequency) receiver or other apparatus to be tested or calibrated, whereby strong signals are produced over the desired wide frequency spectrum at intervals four times the marker interval of the quartz crystal, a substantially weaker signal is produced at intervals twice the marker frequency between the aforesaid quadruple intervals, and a still weaker signal is produced at the marker frequency between the double and quadruple intervals, so that all are utilizable but are recognizably different.

3. A frequency standard for VHF-UHF (very high frequency-ultra high frequency), said standard providing marker signals at marker intervals, and comprising means including a frequency determining crystal to generate a 50 mc. marker signal, a frequency doubling and amplifying network connected to said means and fed by said signal to produce signals of 100 and 200 mc. of increasing strength respectively, a flexible coaxial cable connected to said network, a holder for a crystal diode at the free end of said cable, a crystal diode in said holder having a non-linear characteristic and driven by said network to produce a rich supply of VHF (very high frequency) and UHF (ultra high frequency) harmonics, whereby strong signals are produced at intervals of 200 mc. over a desired wide frequency spectrum, a substantially weaker signal is produced at intervals of 100 mc. between the aforesaid intervals of 200 mc., and a still weaker signal is produced at intervals of 50 mc. between the aforesaid intervals of 100 and 200 mc., all of said signals being utilizable, but the three different kinds of interval being recognizably different, and the free end of said holder having means for detachable connection directly to a UHF (ultra high frequency) receiver or other apparatus to be tested or calibrated.

4. A frequency standard for VHF-UHF (very high frequency-ultra high frequency), said standard providing marker signals at marker intervals, and comprising an oscillator, a 50 mc. quartz crystal connected into said oscillator to control the frequency of said oscillator to generate a 50 mc. marker signal, a 100 mc. frequency doubler and amplifier connected to and fed by said oscillator, a 200 mc. frequency doubler and power amplifier connected to and fed by said 100 mc. doubler, a flexible coaxial cable connected to said 200 mc. doubler, a holder for a crystal rectifier mounted at the free end of the coaxial cable and carrying a silicon crystal diode driven by said power amplifier and having a non-linear characteristic to produce a rich supply of VHF (very high frequency) and UHF (ultra high frequency) harmonics, whereby strong signals are produced at intervals of 200 mc. over a desired wide frequency spectrum, a substantially weaker signal is produced at intervals of 100 mc. between the aforesaid intervals of 200 mc., and a still weaker signal is produced at intervals of 50 mc. between the aforesaid intervals of 100 and 200 mc., all of said signals being utilizable, but the three different kinds of interval being recognizably different, and the free end of said holder having means for detachable connection directly to a UHF (ultra high frequency) receiver or other apparatus to be tested or calibrated.

5. A frequency standard as defined in claim 1, in which the crystal rectifier is mounted in a holder devoid of means adapted to act as a high frequency bypass, whereby the crystal mount is made efficient over so wide a frequency spectrum that a single mount and crystal may be employed.

6. A frequency standard as defined in claim 2, in which the silicon crystal is mounted in a holder devoid of means adapted to act as a high frequency bypass, whereby the crystal mount is made efficient over so wide a frequency spectrum that a single mount and crystal may be employed.

7. A frequency standard as defined in claim 3, in which the crystal rectifier is mounted in a holder devoid of means adapted to act as a high frequency bypass, whereby the crystal mount is made efficient over so wide a frequency spectrum that a single mount and crystal may be employed.

8. A frequency standard as defined in claim 4, in which the silicon crystal diode is mounted in a holder devoid of means adapted to act as a high frequency bypass, whereby the crystal mount is made efficient over so wide a frequency spectrum that a single mount and crystal may be employed.

9. A frequency standard as defined in claim 1, in which the apparatus is provided with a trap circuit tuned to the weaker marker frequency and a switch making said trap circuit optionally useable.

10. A frequency standard as defined in claim 2, in which the apparatus is provided with a trap circuit tuned to a marker frequency, and a switch making said trap circuit optionally useable, and in which it is further provided with a trap circuit tuned to the double marker frequency, and a switch making said latter trap circuit optionally useable.

11. A frequency standard as defined in claim 3, in which the apparatus is provided with a trap circuit tuned to 50 mc., and a switch making said trap circuit optionally useable, and in which it is further provided with a trap circuit tuned to 100 mc., and a switch making said latter trap circuit optionally useable.

References Cited in the file of this patent

UNITED STATES PATENTS

| | | |
|---|---|---|
| 2,265,083 | Peterson | Dec. 2, 1941 |
| 2,484,763 | Sturm | Oct. 11, 1949 |
| 2,498,335 | Hunt | Feb. 21, 1950 |
| 2,557,122 | Leiphart | June 19, 1951 |

OTHER REFERENCES

"General Radio Experimenter," volume 26, No. 2, July 1951.